United States Patent
Wood et al.

(10) Patent No.: US 6,532,288 B1
(45) Date of Patent: Mar. 11, 2003

(54) TANDEM ACCESS CONTROL PROCESSOR CONNECTED TO THE PUBLIC SWITCHED TELEPHONE NETWORK FOR CONTROLLING FEATURES

(75) Inventors: Samuel F. Wood, Los Altos Hills, CA (US); Margaret Susan Asprey, Los Altos, CA (US); Jerry A. Klein, Los Altos, CA (US)

(73) Assignee: Telemaze, Inc., Los Altos, CA (US)

(*) Notice: Subject to any disclaimer, the term of this patent is extended or adjusted under 35 U.S.C. 154(b) by 0 days.

(21) Appl. No.: 09/565,577

(22) Filed: May 4, 2000

(51) Int. Cl.[7] .................................................. H04M 7/00
(52) U.S. Cl. ............................ 379/224; 379/221; 379/11
(58) Field of Search ........................... 379/224, 221.08, 379/221.11, 221.12

(56) References Cited

U.S. PATENT DOCUMENTS

| | | | | |
|---|---|---|---|---|
| 5,566,236 A | * | 10/1996 | MeLampy et al. | ...... 379/210.01 |
| 5,953,392 A | | 9/1999 | Rhie et al. | ................ 379/88.13 |
| 5,958,016 A | | 9/1999 | Chang et al. | ................ 709/229 |
| 5,974,449 A | | 10/1999 | Chang et al. | ................ 709/206 |
| 6,012,088 A | | 1/2000 | Li et al. | ....................... 709/219 |
| 6,014,437 A | | 1/2000 | Acker et al. | ................. 379/219 |
| 6,028,917 A | | 2/2000 | Creamer et al. | ........ 379/100.01 |
| 6,031,836 A | * | 2/2000 | Haserodt | ..................... 370/389 |
| 6,078,581 A | | 6/2000 | Shtivelman et al. | ......... 370/352 |
| 6,104,800 A | | 8/2000 | Benson | ......................... 379/215 |
| 6,259,692 B1 | | 7/2001 | Shtivelman et al. | ........ 370/355 |

OTHER PUBLICATIONS

ADC Telecommunications; *SS7 NewNet SS7 Tutorial*; ©Copyright 1999.

* cited by examiner

*Primary Examiner*—Ahmad F. Matar
*Assistant Examiner*—Rasha S AL-Aubaidi
(74) *Attorney, Agent, or Firm*—Patent Law Group LLP; Brian D. Ogonowsky

(57) ABSTRACT

In one embodiment, the system includes a processor (referred to herein as a tandem access controller) connected to the PSTN which would allow anyone to directly provision, that is to say set-up and make immediate changes to, the configuration of his or her phone line. In another embodiment, a tandem access controller (TAC) subsystem is connected internally to the PSTN in a local service area. The TAC provides features, selected by the subscriber, to all edge switches connected to the PSTN tandem switch. In one embodiment, the TAC is controlled by the subscriber using the web.

16 Claims, 9 Drawing Sheets

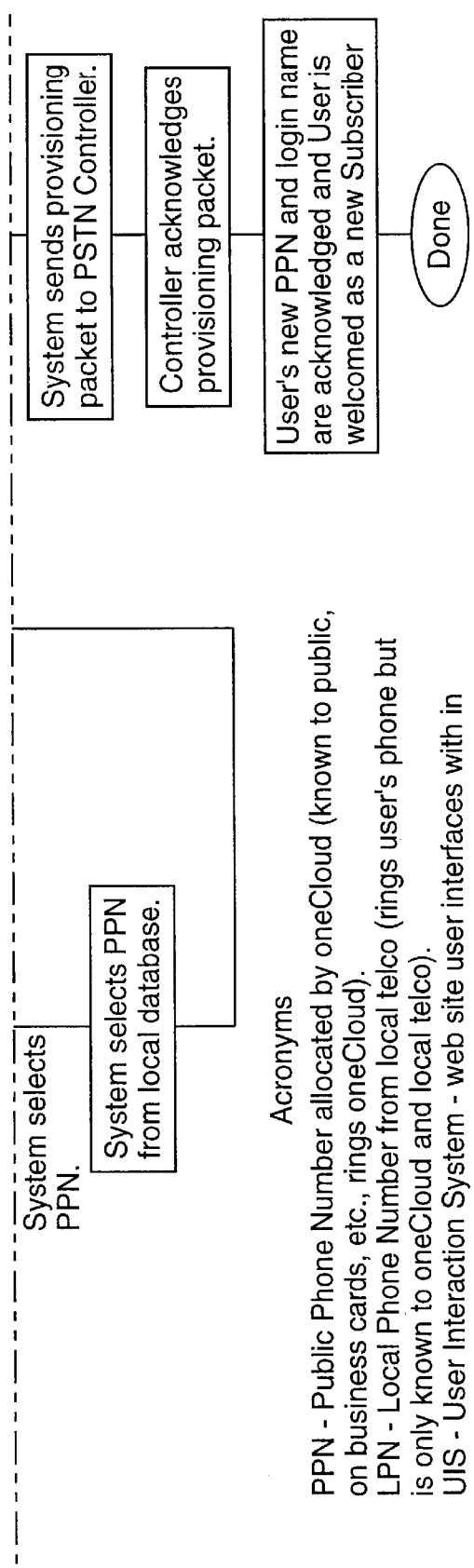

Acronyms
PPN - Public Phone Number allocated by oneCloud (known to public, on business cards, etc., rings oneCloud).
LPN - Local Phone Number from local telco (rings user's phone but is only known to oneCloud and local telco).
UIS - User Interaction System - web site user interfaces with in order to control phone features.
TAC - Tandem Acces Controller - System that directly accesses the PSTN.

FIG. 3B

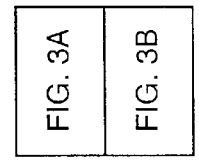

FIG. 3

TANDEM ACCESS CONTROL PROCESSOR CONNECTED TO THE PUBLIC SWITCHED TELEPHONE NETWORK FOR CONTROLLING FEATURES

FIELD OF THE INVENTION

This invention relates to telephone services and, in particular, to a system for allowing a subscriber to select features of the subscriber's telephone service.

BACKGROUND

People have used various means for limiting interruptions due to the telephone. In the past, people used switchboards and secretaries to screen incoming, or inbound, calls. Voice mail systems took over some of this role both in the home and in the central office. Today, there are web-based companies managing 3rd-party call control, via the toll-switch network, which allow users to enter call control information through a web portal. There are also edge devices in each of the public telephone company's central offices which provide local control, but offer an extremely limited number of features and do not provide true 3rd-party call control.

The web-based toll systems provide good user interaction but they are not economical and cannot take advantage of local number portability because they do not provide local control and connectivity.

The Public Switched Telephone Network (PSTN) consists of a plurality of edge switches connected to telephones on one side and to a network of tandem switches on the other. The tandem switch network allows connectivity between all of the edge switches, and a signalling system is used by the PSTN to allow calling and to transmit both calling and called party identity.

Until now, optional features were provided by the local service telephone company (telco) through the edge switch at the central office (CO). It was not possible to provide optional features through any other means. Control of these features was done through the first party (calling party) or the second party (called party), or worse yet, manually by calling the business office.

In the past, numerous devices have been built that allow the connection of two lines together at an edge switch. These devices can be used to add features to a telephone network by receiving a call on one line and then dialing out on another line. The problem with these devices is that, because they are connected through an edge switch, transmission losses and impairments occur, degrading the overall connection. In addition, signalling limitations prevent full control, by the subscriber or the system, over the call.

The invention described herein connects at the tandem, thereby eliminating these problems.

In the edge devices residing in the PSTN central offices, the 1st party (the calling party) has numerous features available (dialing options). The 2nd party (called party) also has options available such as call forwarding, but these features typically require access from the first or second party's device and are extremely awkward to program. The user interaction is not only awkward, it is limited and requires interaction with the telephone company to provision them. In other words, past systems for provisioning, meaning addition, modification, or control of telephone features, required a subscriber to make the feature selection through the telephone business office. Central office workers would then implement the provisioning under request of the business office.

Call Forwarding is one popular provision. There is signification transmission degradation for Call Forwarding to take place. The calling party pays for a call to the edge device, and the edge subscriber, the called party, pays for the call to the forwarding number. For enhanced inbound call control to occur, a direct 3rd-party call control means is needed.

A variety of services have arisen to address the problems mentioned above. Many of these systems allow the called party to make changes to his/her call forwarding attributes which do not allow direct 3rd-party call control. These services provide good user interaction, some via the internet, but they rely upon the toll network through the use of "800" numbers. This requires the subscriber to pay by the minute and does not allow the subscriber to take advantage of number portability in order to obtain 3rd-party call control. There are other toll network mechanisms for remote call forwarding. For example, MCI offers a service where the customer can remotely change the forwarding target number for "800" numbers. Contacting the ultimate end-user before terminating the first incoming call is similar to the manner in which "800" credit calls and collect calls are processed, but these are not done at the local subscriber level.

In addition to these toll services, there are edge devices that perform some of the same services. Edge devices such as phones and PBXs that include voice mail, inter-active voice response, call forwarding, speed calling, etc., have been used to provide additional call control. These devices allow the phone user direct control over incoming and outgoing calls. The disadvantage of edge devices is that they add cost, degrade voice and transmission quality, can be difficult to program, are not easily programmed remotely, can require the user to pay for two lines, provide lower quality of service, and cannot provide the same level of functionality as a system that controls the PSTN directly. There are Voice Over Internet Protocol (VoiP) products emerging that provide better user interfaces and control but they do not take advantage and voice quality of the PSTN.

SUMMARY

The present invention adds direct control of third party call control features, but does not suffer from any of the disadvantages listed above, and allows the subscriber to manage his/her telephone, system in a dynamic and exceptionally useful manner that is not currently available through the existing PSTN. The invention allows enhanced direct third-party call control features, such as selective call routing and remote dialing, to be added to the PSTN (Public Switched Telephone Network) using local call control and providing dynamic provisioning of the system by the subscriber. Direct 3rd-party control means that the ability to provision the 3rd-party features is directly available to a subscriber, eliminating the need to go through the telephone company (telco) business office.

In one embodiment, the system includes a processor (referred to herein as a tandem access controller) connected to the PSTN which would allow anyone to directly provision, that is to say set-up and make immediate changes to, the configuration of his or her phone line. In another embodiment, a tandem access controller (TAC) subsystem is connected internally to the PSTN in a local service area. The TAC provides features, selected by the subscriber, to all edge switches connected to the PSTN tandem switch. Connecting directly to the PSTN tandem switch (or embedding the system into the tandem switch) eliminates the signal degradation problems previously described.

In one embodiment, the system allows provisioning of features via the internet under direct control of the subscriber. Recently, several products have been introduced that provide a means of controlling features via the public internet. However, all these devices fall short in that they require the subscriber to obtain an "800" number or some other number that requires the subscriber to pay a toll charge each time a call is made. The present invention connects locally, so no toll charges are incurred.

The web-enhanced services in one embodiment of the invention coexist with and overlay the local phone service at the local level, thereby providing good economics and user interaction, single number access to multiple subscriber devices, connectivity without transmission impairments and true, direct 3rd-party call control.

The present invention relies upon use of local telephone facilities thereby eliminating all the extra charges associated with making toll calls. It also allows the user to take advantage of number portability and keep his/her existing public phone number.

DETAILED DESCRIPTION OF THE EMBODIMENTS

Figure 1:
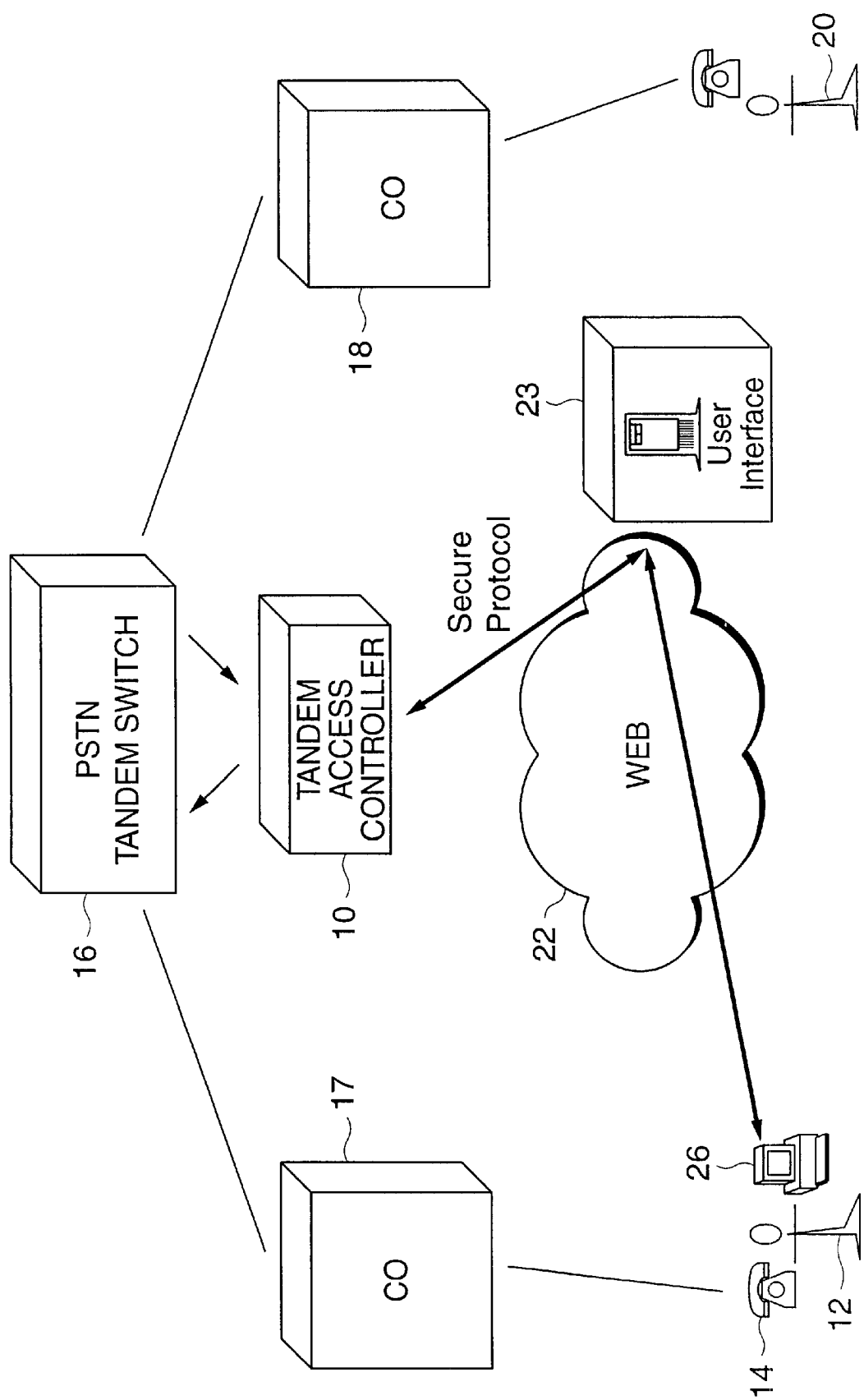
FIG. 1 illustrates the tandem access controller (TAC) of the present invention connected to the existing PSTN tandem switch, the TAC providing features for the subscriber's telephone as requested by the subscriber via the web.

FIG. 1 shows a tandem access controller (TAC) 10 that allows an authorized subscriber 12 to establish 3rd-party control criteria for calls to the subscriber's telephone 14 (having a "public" phone number that callers dial). In one embodiment, the TAC 10 is a programmed processor. The TAC 10 may use any combination of hardware, firmware, or software and, in one embodiment, is a conventional computer programmed to carry out the functions described herein.

The TAC 10 is connected to or inside the conventional PSTN tandem switch 16 such that calls may flow through the TAC 10 in the same manner as the existing PSTN tandem switch, except that additional 3rd-party features are applied to the call. As is well known, PSTN tandem switches are exchanges that direct telephone calls (or other traffic) to central offices 17, 18 or to other tandem switches. Details of the operation of the existing phone network may be found in the publication entitled "New Net SS7 Tutorial," by ADC Telecommunications, copyright 1999, incorporated herein by reference. Additional details may be found in the numerous books describing the PSTN.

The PSTN tandem switch 16 directs a first call (from the calling party 20 to the subscriber's phone 14 using the subscriber's public phone number) to the TAC 10, which in turn places a second call, subject to 3rd-party control information, to the subscriber's "private" phone number without yet terminating the first call. When the subscriber 12 terminates (or answers) the second call, the TAC 10 terminates the first call and connects it to the second call, thereby connecting the calling party 20 to the subscriber 12. Hence, the calling party essentially calls the TAC 10, using the subscriber's public phone number, and the TAC 10, after processing the call using the selected features, calls the subscriber, as appropriate, using the subscriber's private phone number and connects the two calls. The process is transparent to the parties.

The TAC 10 is connected inside the PSTN in the sense that it is not an edge device such as a PBX or central office (CO) switch because it does not connect directly to subscribers. Rather, it redirects calls to subscribers. The TAC 10 provides intelligent interconnection between a calling party and a subscriber.

Figure 2:
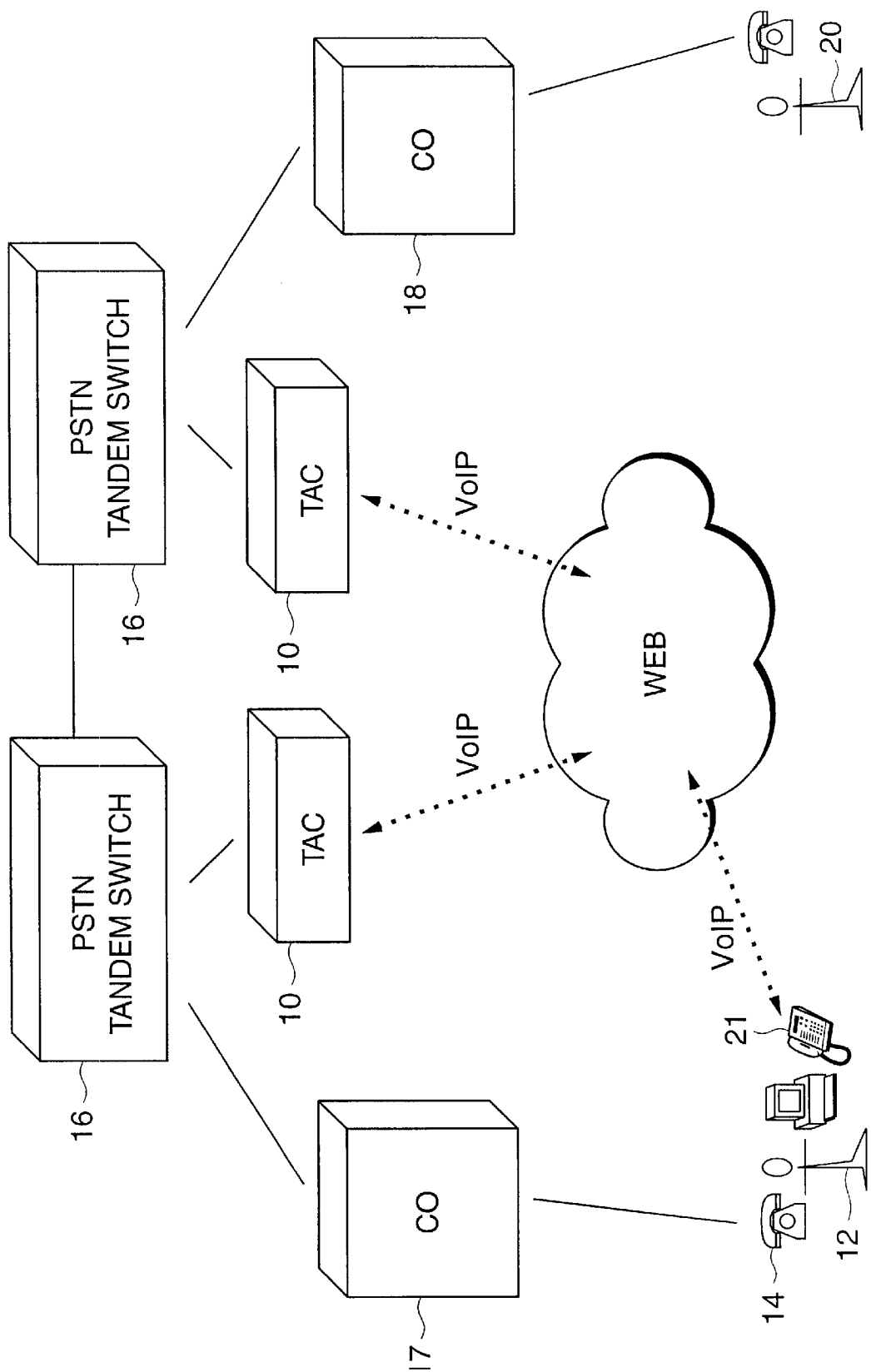
FIG. 2 illustrates a system similar to FIG. 1 but showing multiple tandem switches and TAC's and also showing how the subscriber may, in additional to using the standard telephone, make phone calls using Voice Over IP via a conventional digital telephone.

The reader should keep in mind that although only one tandem switch 16 is shown in FIG. 1, the invention will apply equally well to a network of tandem switches, as shown in FIG. 2. FIG. 2 also illustrates how the subscriber can make calls using voice over IP via a conventional digital telephone 21.

FIG. 1 illustrates the preferred method for an authorized subscriber to modify the 3 rd party control criteria by means of the world wide web 22 (and web server 23) using an internet browser. By "authorized" we mean a subscriber who is registered and has "logged-in" with appropriate security and password controls. The subscriber 12 interacts with the web 22 via the Internet to quickly and easily specify the enhanced 3rd-party call control features. Web 22 then relays this information, in appropriate form, to the TAC 10. Preferably, the link to the TAC 10 uses a secure protocol. Examples of features that can be selected by the subscriber include: conditional call blocking, call forwarding, call altering, time of day conditions, day of week conditions, follow-me, caller recognition/password, caller ID, call screening/retrieval from voice mail, speed dialing, interactive voice response, and speech recognition. Any other feature could be added. These features can be implemented in the TAC 10 using known software techniques since such features are known. Message outgoing call control includes: click-to-dial calling and group calling/messaging.

The invention may also include ivr/vm/voverip.

Figure 3:
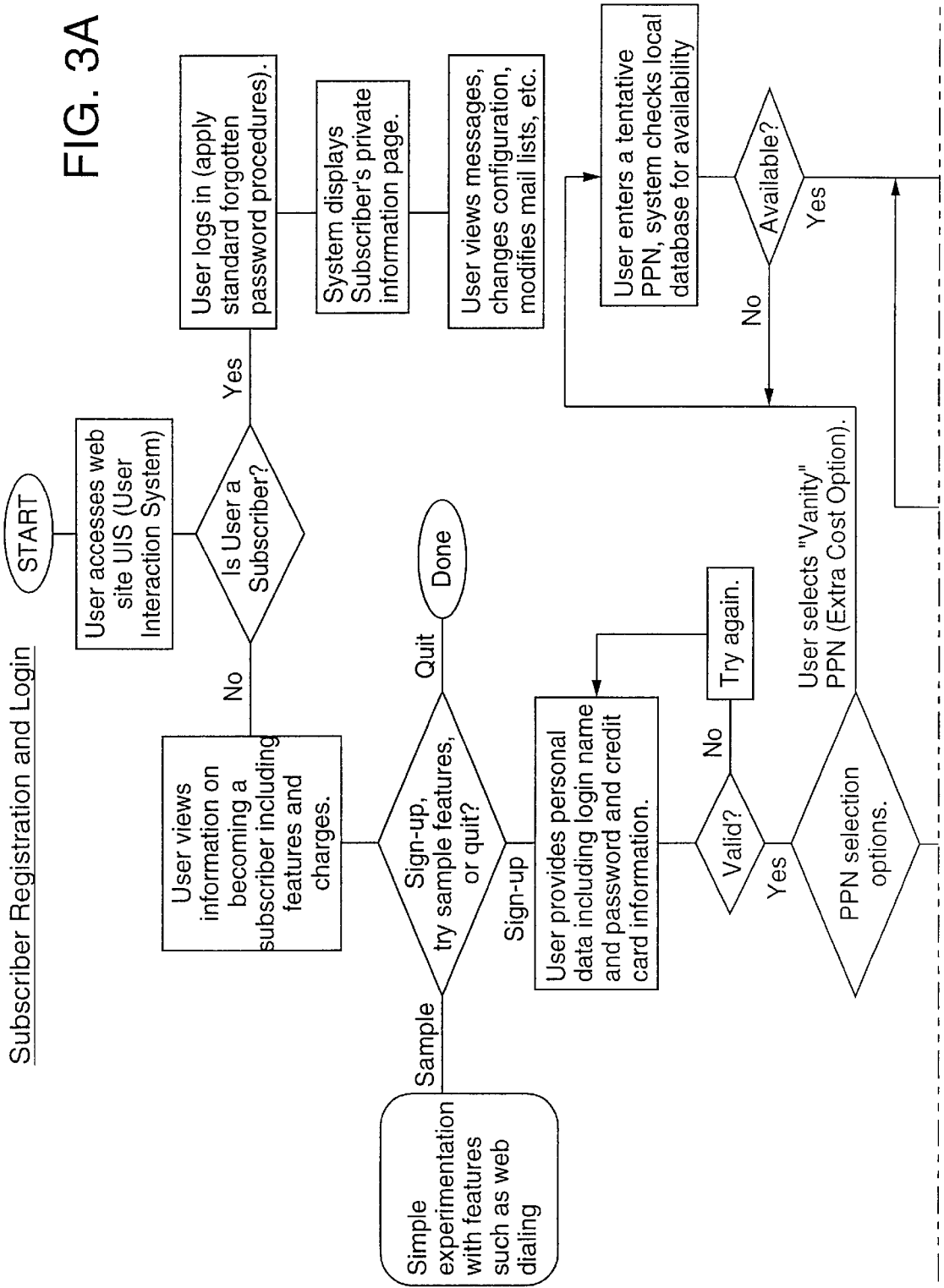
FIG. 3 is a flowchart of one method that a person may use to set up a subscriber account and to designate features the subscriber would like for his/her telephone.

FIG. 1 uses a public internet portal connected via a data link to the TAC 10 or other interface system. As a registered subscriber, a user logs onto the portal (FIG. 3) and is granted access, allowing the user to make additions or changes to features such as speed calling, call forwarding, selection of such descriptors as time of day, busy status, callerID status, etc. A user-friendly web page leads the subscriber through the various procedures and available features. The selections made by the subscriber are translated into provisioning data and transmitted to the TAC 10. The TAC 10 in turn keeps track of incoming and outgoing calls based on this information.

The subscriber can also program a set of the call control features via a telephone link in the event a data link connection is unavailable.

Figure 4:
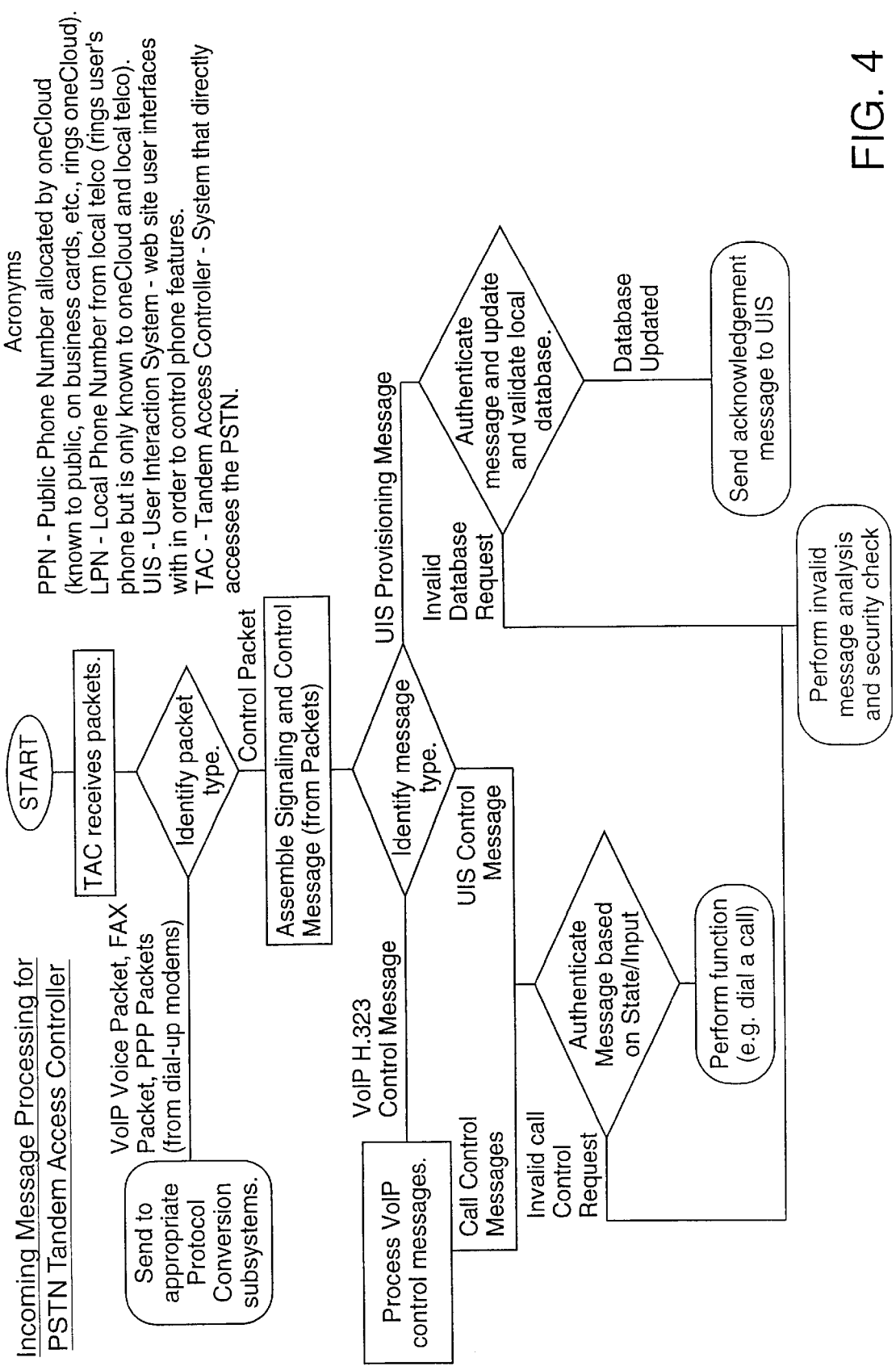
FIG. 4 is a flowchart of a method that can be performed by the TAC in response to the subscriber (or other service) controlling the TAC, using the web (or other packet-based system), to change the subscriber's telephone provisioning or perform another function, such as make a VoIP call.

FIG. 4 is a flowchart of actions that may be taken by the TAC 10 in response to the subscriber (or other service) controlling the TAC, using the web or other packet-based system, to change the subscriber's telephone provisioning or perform another function, such as make a VoIP call.

Figure 5:
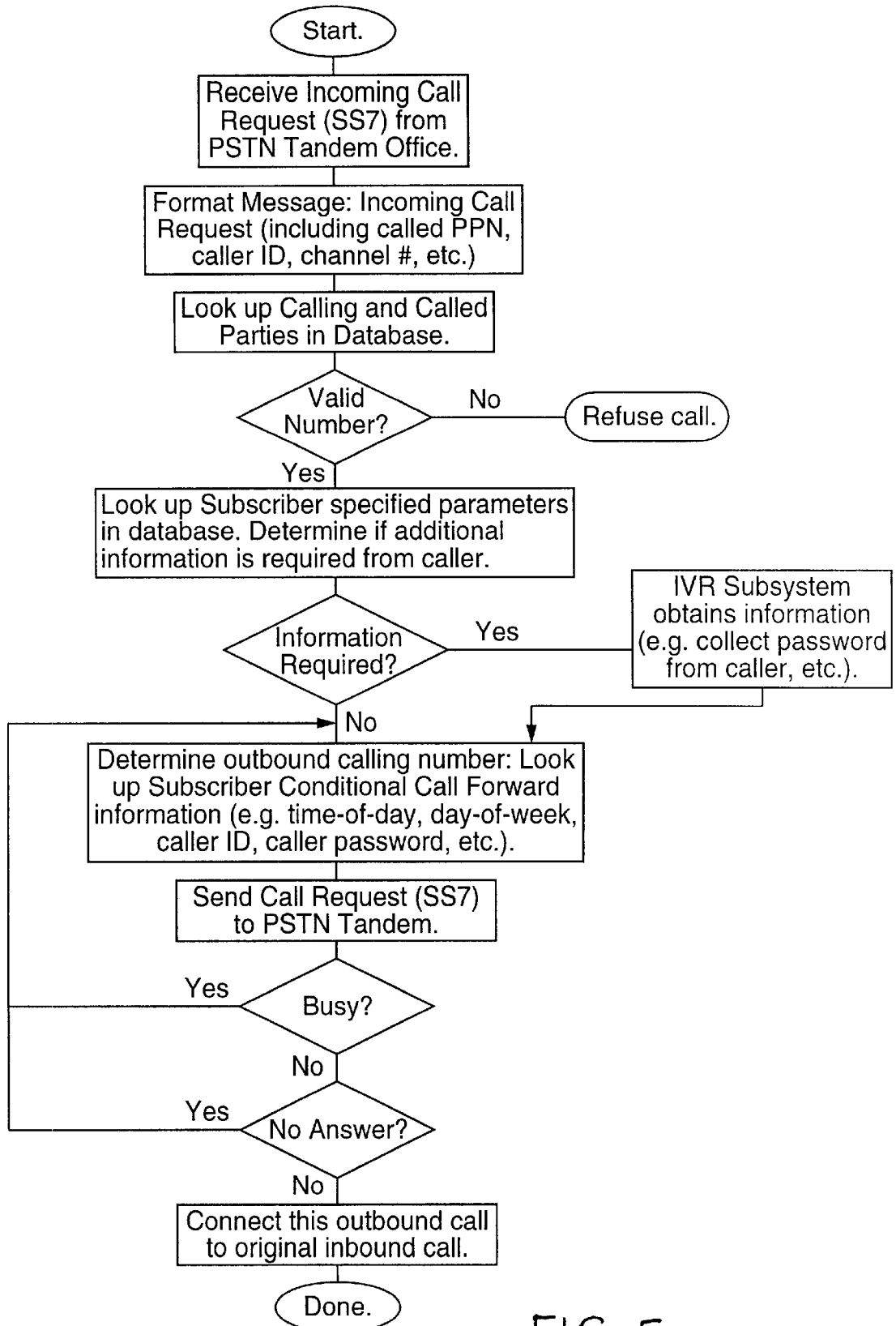
FIG. 5 is a flowchart of a method that can be performed by the TAC in response to an inbound call to the subscriber.

FIG. 5 is a flowchart of actions taken by the TAC 10 in response to an inbound call (using the subscriber's public phone number) to the subscriber. Examples of some of the actions taken by the TAC 10 are:

- Receives SS7 data indicating an incoming call
- Stores phone numbers downloaded from provisioning system
- Charts identity of calling party
- Checks time of day
- Stores lists of numbers in groups used for processing incoming calls
- Places outgoing calls in response to incoming calls according to information downloaded on the data link.

Incoming call data is received by the TAC 10 from the tandem switch 16. The TAC 10 processor checks calling and called numbers, class of service, time of day, number lists, etc. In some cases additional data is gathered from the calling party via a DSP (Digital Signal Processing) system and stored in the system memory. The DSP system is used to play call progress tones and voice announcements as required. Voice announcements can be played through the DSP system. In response to the call data, an outgoing call to the subscriber 12 may be placed back through the tandem switch 16 by TAC 10. The TAC 10 links the two calls and monitors the connection.

Information about the call may be collected by the TAC 10 and sent to the subscriber or a 3rd party for display. Such information may be the length of the call or information used to bill the subscriber for the use of the system. The provisioning system can also collect control information from a 3rd party and relay it back to the TAC 10, which will then affect the call accordingly.

Figure 6:
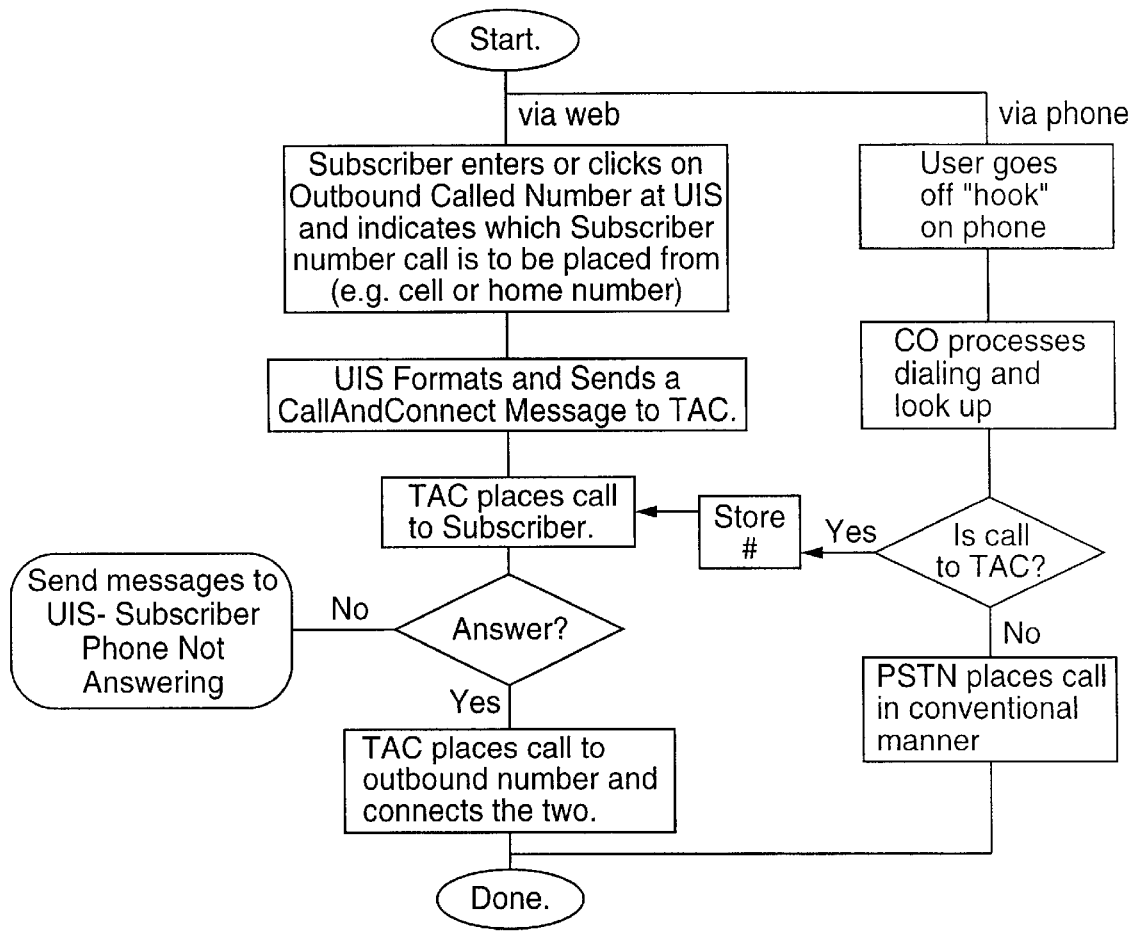
FIG. 6 is a flowchart of a method performed by the subscriber and the TAC when the subscriber desires to make an outbound call via the web or using a conventional telephone.

FIG. 6 is a flowchart of actions taken by the subscriber 12 and the TAC 10 when the subscriber desires to make an outbound call via the web or using a conventional telephone. When using the web to place a call, the subscriber may simply click a name on the computer screen 26 using a mouse.

Figure 7:
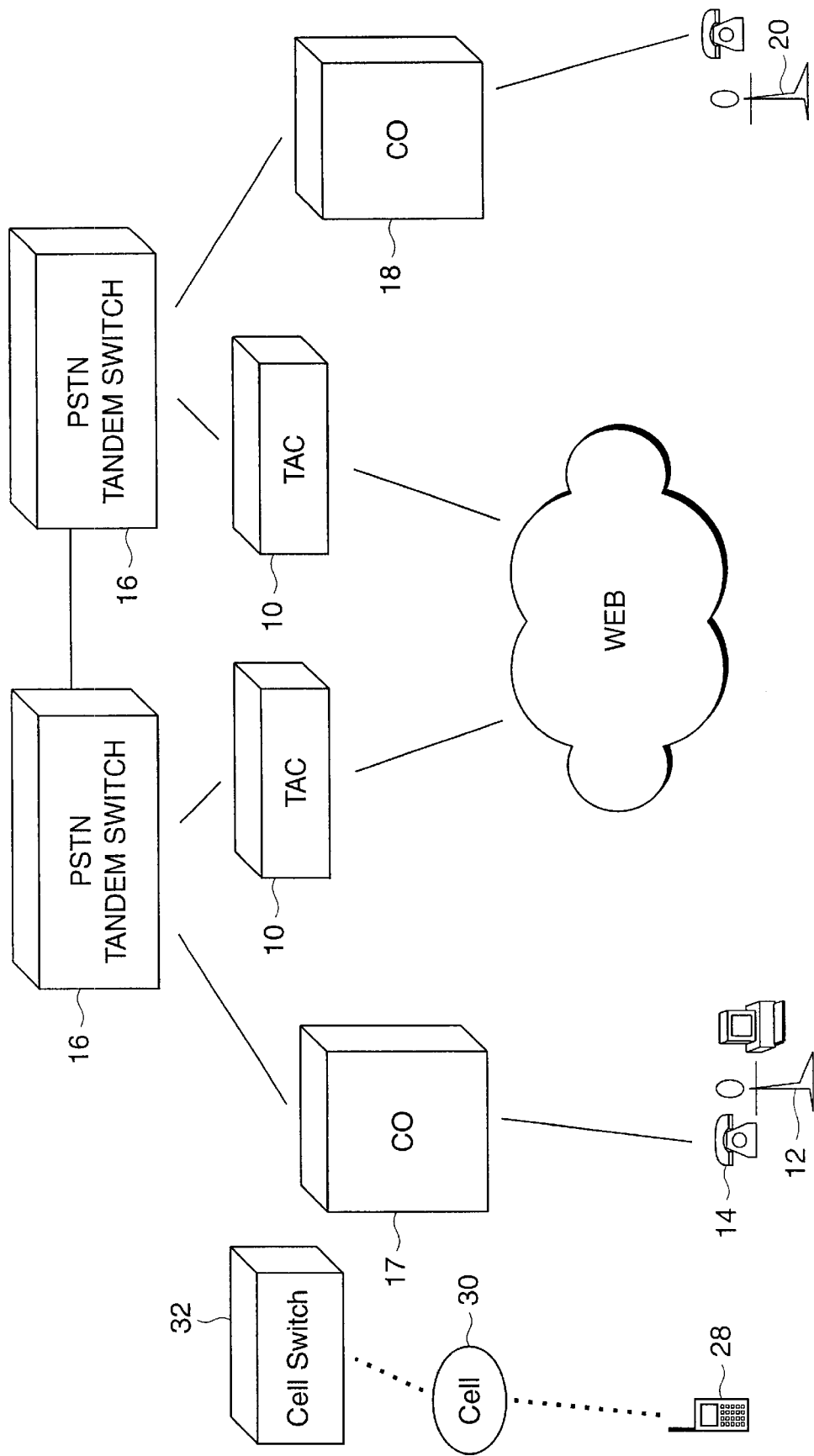
FIG. 7 illustrates a system, using the TAC, that allows wireless cell phones to obtain the same provisioning options as the conventional telephones.

FIG. 7 illustrates a system, using the TAC 10, that allows wireless cell phones 28 to obtain the same provisioning options as the conventional telephones 14. A local cell 30 and a cell switch 32 are also shown in FIG. 7.

Figure 8:
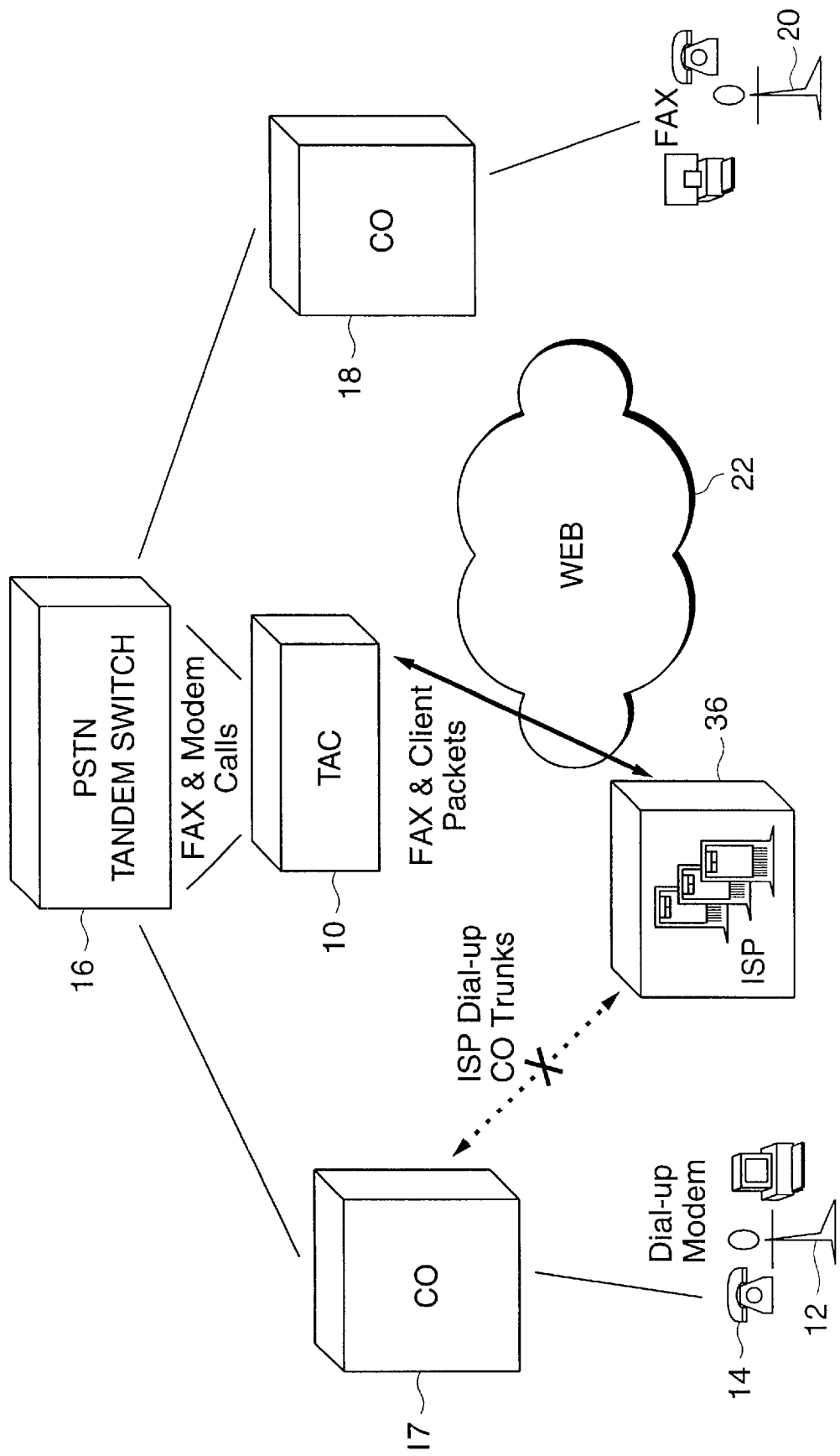
FIG. 8 illustrates a system, using the TAC, that allows fax and modem calls to benefit from the provisioning offered by the TAC.

FIG. 8 illustrates a system, using the TAC 10, that allows fax and modem calls to benefit from the provisioning offered by the TAC 10. The TAC 10 may interface the ISP 36 through the web 22.

One embodiment of the invention allows a subscriber to view the current state of his/her telephone via the Internet. Internet is a term of art by which we mean an interconnection of packet switched networks. Prior to this invention there was no way for a user to examine the status of a telephone line. Recently, several products have been introduced that provide a means of examining the voice message boxes.

An internet portal is connected via a data link to the TAC 10. When a user logs onto the internet portal and is granted access to an individual subscription, the user can examine the status of calls/features. This information is transmitted from the TAC 10 to the web portal and translated into user viewables. The TAC 10 keeps track of incoming and outgoing calls based on this information.

The TAC 10 may be implemented using conventional processor hardware. The connection to the tandem switch 16 may be as simple as a telephone circuit, since the TAC 10 receives an incoming call from a caller and processes the call. Devising the software/firmware use to control the TAC 10 is well within the capability of those skilled in the art since the various control features that can be made available are generally already known.

Certain advantages that can be obtained using the invention include the following:

- Web-Based Telecom Navigator
- Manage Incoming Call Control
- Conditional Call Blocking/Forwarding/Alerting
- Time-of-Day, Day-of-Week, Follow-Me, Caller Recognition/Password, Caller ID, etc.
- Call Screening/Retrieval from Voice Mail
- Interactive Voice Response and Speech Recognition
- Manage Outgoing Call Control
- Click-to-Dial Calling
- Group Calling and Messaging
- Web-Based Billing
- Web-Driven Personal Communications Management
- Cost-Effective Single Phone Number Access
- On-Line "Personal Digital Assistant"
- On-Line "Telcom Navigator"
- Inspired User Interaction
- Secure and Reliable Technology
- Cost-Effective Single Phone Number Access
- CLEC Status
- Free Local Calls, Incoming Calls (not 800 Toll Service)
- Retain Current Number (Local Number Portability)
- Low-Cost Calling Throughout LATA
- Flat-Rate Foreign Exchange
- Single Installation Covers Entire LATA
- VoIP Toll-Bypass
- Compatible With Existing Devices, Standards
- Standard DTMF and VoIP Phones
- Wireless Phones
- Standard Wired/Wireless and PIM Browsers
- Web-Based Personal Digital Assistant
- Centralized and Consistent Personal Data
- Build Once, Use Anywhere
- Private/Public Phone Directories and Calendars
- "Post-It" Style Annotation of Numbers
- Web Dialing
- Click-to-Dial from Web Pages, Directories, Calendars
- Multiple Phone List Management
- Unified Messaging
- Voice Mail Access, Prompts, Alert Via Web
- User Interaction
- Expected Behavior
- Compatible with Familiar Products (e.g. Palm Pilot)
- Commonality Between All Wired and Wireless
- Mode-Based Definition and Selection
- Vacation, Dinner Time, Go Away, Family Call Waiting Templates Learning Modes
Persona-Based User Interaction Design
Speech recognition
Windows drag and drop
Automatic Data Capture
Build Phone List Based on Collected Usage Information
Drag and Drop Into Lists
Secure and Reliable Technology
Separate Web-Site and Link Gateway
No Direct External Access to Gateway
Additional Security Layer
No Denial-of-Service to Voice Links
VoIP Link Degradation Detection
Automatic Cutover to PSTN
E-Commerce Security
Billing Encryption While particular embodiments of the present invention have been shown and described, it will be obvious to those skilled in the art that changes and modifications may be made without departing from this invention in its broader aspects and, therefore, the appended claims are to encompass within the true spirit and spirit and scope of this invention.

We claim:

1. A controller connected to a public switched telephone network (PSTN) tandem switch comprising:

a processor, within the PSTN and connected to said tandem switch, for receiving a first call through said tandem switch from a calling party intended for a subscriber after said calling party has entered a first telephone number, said first telephone number being said subscriber's public telephone number, said processor applying features, selected by said subscriber, to said first call and placing a second call to said subscriber using a second telephone number different from said first telephone number, said second call being a non-toll call to said subscriber, said processor completing a communications path between said calling party and said subscriber after said subscriber has received said second call; and an Internet connection to said processor to allow said subscriber to select features to be applied to a call intended for said subscriber.

2. The controller of claim 1 wherein answering said second call causes said processor to connect a calling party's communication device to other than said subscriber's telephone, as designated by said subscriber pursuant to said features selected by said subscriber.

3. The controller of claim 1 wherein said first call is placed by said calling party through a PSTN central office to said processor, and said second call is placed by said processor through a central office.

4. The controller of claim 1 wherein said features are selected from the group consisting of conditional call blocking and call forwarding.

5. The controller of claim 1 wherein said features include selective call forwarding.

6. The controller of claim 1 wherein said features include selective call forwarding, wherein said processor makes said second call to a particular communications device based on a time of said first call.

7. The controller of claim 1 wherein said features include selective call forwarding, wherein said processor makes said second call to a particular communications device based on the particular calling party making said first call.

8. The controller of claim 1 wherein:

said processor also receives a local third call, via said tandem switch, placed by said subscriber for a third party, said processor placing a fourth call to said third party, via said tandem switch; and said processor connects said subscriber to said third party after said third party receives said fourth call.

9. A method performed by a processor connected to a public switched telephone network (PSTN) tandem switch and within the PSTN comprising:

receiving a first call through said tandem switch from a calling party intended for a subscriber after said calling party has entered a first telephone number, said first telephone numbe being said subscriber's public telephone number, said processor applying features selected by said subscriber, to said first call and placing a second call to said subscriber using a second telephone number different from said first telephone number, said second call being a non-toll call to said subscriber, said processor completing a communications path between said calling party and said subscriber after said subscriber has received said second call; and activating features selected by said subscriber via the Internet to be applied to a call intended for said subscriber.

10. The method of claim 9 further comprising connecting a calling party's communication device to other than said subscriber's telephone, as designated by said subscriber pursuant to said features selected by said subscriber, after said subscriber has answered said second call.

11. The method of claim 9 wherein said first call is placed by said calling party through a PSTN central office to said processor, and said second call is placed by said processor through a central office.

12. The method of claim 9 wherein said features are selected from the group consisting of conditional call blocking and call forwarding.

13. The method of claim 9 wherein said features include selective call forwarding.

14. The method of claim 9 wherein said features include selective call forwarding, wherein said processor makes said second call to a particular communications device based on a time of said first call.

15. The method of claim 9 wherein said features include selective call forwarding, wherein said processor makes said second call to a particular communications device based on the particular calling party making said first call.

16. The method of claim 1 further comprising:

receiving a local third call by said processor, via said tandem switch, placed by said subscriber for a third party, said processor placing a fourth call to said third party, via said tandem switch; and connecting said subscriber to said third party after said third party receives said fourth call.

* * * * *